Patented Dec. 10, 1929

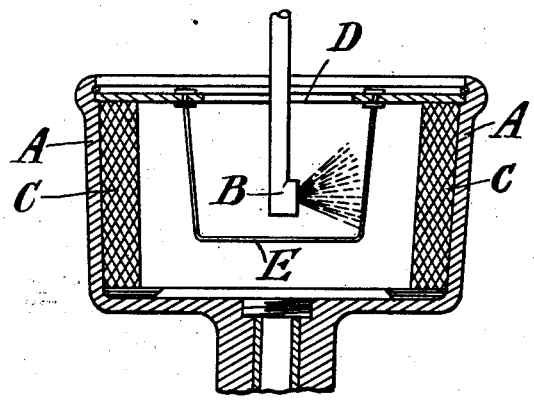
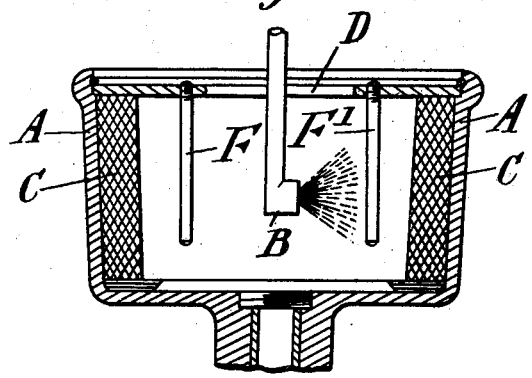
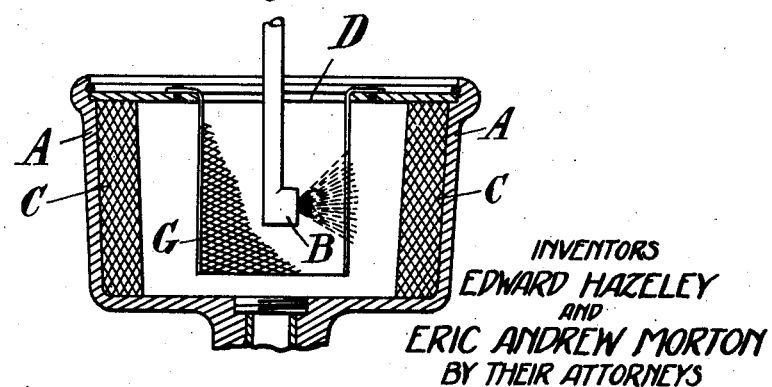

1,739,458

UNITED STATES PATENT OFFICE

EDWARD HAZELEY AND ERIC ANDREW MORTON, OF COVENTRY, ENGLAND, ASSIGNORS TO COURTAULDS LIMITED, OF LONDON, ENGLAND

MANUFACTURE AND PRODUCTION OF ARTIFICIAL THREADS, FILAMENTS, RIBBONS, AND THE LIKE

Application filed September 7, 1928, Serial No. 304,490, and in Great Britain November 7, 1927.

In the manufacture of artificial threads filaments and the like by the box spinning process, it is usual to pass the thread after leaving the spinning bath into a rapidly rotated box, the thread coiling itself against the wall of the said box, forming an annular ring or cake hereinafter referred to as a "cake". It has already been proposed to wash the cake while it is still in the centrifugal apparatus in which the thread is collected, or in another centrifugal apparatus into which the cake has been transferred. During such washing process, the water is introduced into the centre of the box preferably in the form of a spray, various types of spraying nozzles or other spraying apparatus being employed and in which the said spraying nozzle or other spraying apparatus may or may not rotate with the box. In those cases in which the box containing the cake rotates but the spraying apparatus does not rotate, that is to say, is either stationary or has merely a reciprocating motion in a vertical direction, it has been found that there is a tendency for one or more of the threads from the rotating cake to catch on to the nozzle or other spraying apparatus, whereupon the thread winds round the spraying apparatus aforesaid causing considerable damage and waste.

We have now found that when treating a cake of thread in a centrifugal box by means of a liquid supplied through a non-rotating spraying device situated at or towards the centre of the said box, the thread may be prevented from wrapping round the spraying device by providing one or more members, more or less vertical, for example a cylinder of wire gauze, or preferably rods or the like situated between the cake and the spraying device and spacially separated from the cake and so arranged as to rotate with the box. These members, which we will refer to as "rods" may be fixed to depend from the lid of the box, or may be fixed at their lower ends to the bottom of the box and project up into the space between the cake and the spraying device. The rods may be made of ebonite or of any other suitable material such for example as wire which is not attacked by the liquid employed. As a general rule two such rods are sufficient to prevent the thread from reaching and wrapping round the spraying device in which case the rods are preferably placed at an angle of say 180° from each other, so that they balance one another during the rapid rotation of the box and so avoid strains. If desired, the free or loose ends of the rods, that is to say, the lower ends of the depending rods, or the upper ends of the upwardly projecting rods may be fastened together by a wire or by any other suitable means, in order to prevent the free or loose ends of the said rods from being driven outwards by the centrifugal force of the rotating box, and in this case the rods may be arranged more or less parallel with the sides of the box, and the two rods and their connecting piece may consist of one piece of wire rod.

This process is applicable to all such artificial products as can be collected in a centrifugal box, such as threads, filaments and ribbon.

We will further describe three methods of carrying out the invention in practice with reference to the accompanying drawing which illustrates in vertical section three arrangements according to this invention but the invention is not restricted thereto.

In each of these sections, A represents the centrifugal box, B represents the stationary spraying nozzle, C represents the cake of thread and D represents the lid of the box. In Figure 1, E represents a piece of wire, the opposite ends of which are attached respectively to opposite sides of the central opening in the lid D, the wire itself being bent, as shown in the figure. In Figure 2 F, F$^1$ represent two rods, and in Figure 3, G represents a cylinder of wire gauze, both the rods and the wire gauze being attached to and depending from the lid D.

What we claim is:—

1. Apparatus for the treatment with liquid of a cake of artificial threads, filaments, ribbon and the like, comprising a centrifugal box, a non-rotating spraying device situated towards the centre of the said box and at least one member practically vertical, situated between the cake and the spraying device, and spacially separated from the cake and arranged so that it rotates with the box.

2. Apparatus for the treatment with liquid of a cake of artificial threads, filaments, ribbon and the like, comprising a centrifugal box, a non-rotating spraying device situated towards the centre of the said box and a bent member, the two ends of which are attached to the lid of the box, the portions of the member adjacent to the ends depending practically vertically from the lid and situated between the cake and the spraying device, and spacially separated from the cake, while the lower ends of the two depending pieces are connected by the central piece of the member.

In testimony whereof we have signed our names to this specification.

EDWARD HAZELEY.
ERIC ANDREW MORTON.